US012742224B2

(12) United States Patent
Dahal

(10) Patent No.: US 12,742,224 B2
(45) Date of Patent: Sep. 22, 2026

(54) INTEGRATED RECOVERY OF METALS FROM COMPLEX SUBSTRATES

(71) Applicant: YAVA INTERNATIONAL INC., Fonthill (CA)

(72) Inventor: Madhav Dahal, Toronto (CA)

(73) Assignee: Yava International Inc., Fonthill (CA)

( * ) Notice: Subject to any disclaimer, the term of this patent is extended or adjusted under 35 U.S.C. 154(b) by 0 days.

(21) Appl. No.: 16/696,838

(22) Filed: Nov. 26, 2019

(65) Prior Publication Data

US 2020/0165697 A1 May 28, 2020

Related U.S. Application Data

(62) Division of application No. 14/780,821, filed as application No. PCT/CA2014/050324 on Mar. 28, 2014, now Pat. No. 10,487,374.

(30) Foreign Application Priority Data

Mar. 28, 2013 (CA) ..................................... 2810935
Jul. 15, 2013 (CA) ..................................... 2821023

(51) Int. Cl.

| | |
|---|---|
| ***C22B 3/14*** | (2006.01) |
| ***C22B 3/00*** | (2006.01) |
| ***C22B 11/00*** | (2006.01) |
| ***C22B 15/00*** | (2006.01) |
| ***C22C 5/02*** | (2006.01) |
| ***C22C 5/06*** | (2006.01) |
| ***C22C 9/00*** | (2006.01) |
| ***C22C 11/00*** | (2006.01) |
| ***C22C 18/00*** | (2006.01) |

(52) U.S. Cl.

CPC ................ *C22B 3/14* (2013.01); *C22B 11/04* (2013.01); *C22B 11/044* (2013.01); *C22B 11/046* (2013.01); *C22B 13/04* (2013.01); *C22B 13/045* (2013.01); *C22B 15/0078* (2013.01); *C22B 19/24* (2013.01); *C22C 5/02* (2013.01); *C22C 5/06* (2013.01); *C22C 9/00* (2013.01); *C22C 11/00* (2013.01); *C22C 18/00* (2013.01); *Y02P 10/20* (2015.11)

(58) Field of Classification Search

CPC ....... C22B 3/14; C22B 15/0078; C22B 19/24; C22B 11/044; C22B 13/045; C22B 11/04; C22B 13/04; Y02P 10/20

See application file for complete search history.

(56) References Cited

U.S. PATENT DOCUMENTS 3,880,981 A 4/1975 Garingarao et al.
3,967,957 A 7/1976 Fonseca
3,981,966 A * 9/1976 Baucom .............. C22B 15/0093 423/104
4,988,487 A 1/1991 Lai et al.
5,308,381 A 5/1994 Han et al.
5,328,669 A * 7/1994 Han ...................... C22B 11/042 423/32
8,388,729 B2 * 3/2013 Welham .................. C22B 19/24 75/743
2007/0041883 A1 * 2/2007 McDevitt ................ C22B 19/30 423/22
2007/0178031 A1 * 8/2007 Freeman ................. C22B 19/26 423/109
2008/0078269 A1 * 4/2008 Abe ........................ C22B 11/04 75/744
2011/0182786 A1 7/2011 Burba, III

FOREIGN PATENT DOCUMENTS

CN 1088266 A * 6/1994
JP 7224334 8/1995
WO 2009009825 A1 1/2009
WO WO-2011024164 A1 * 3/2011 ......... C22B 15/0095
WO WO-2012040829 A1 * 4/2012 ............. C22B 19/02

OTHER PUBLICATIONS

First Office Action in related Chinese Application No. 201480024299.2 issued Oct. 28, 2016 (16 pages).
Zhao, Youcai et al., "Hydrometallurgical Technologies with Alkaline Media", Excerpt; Metallurgical Industry Press, Apr. 2009 (6 pages).
Second Office Action in related Chinese Application No. 2014800242992.2 issued Aug. 3, 2017 (19 pages).
Luo Mei, "Gold Smelting and Jewelry Processing", Excerpt from First Edition; China Science and Culture Press, Aug. 2003 (7 pages).
Examination Report No. 1 in related Australian Patent Application No. 2014245777 issued Dec. 5, 2017 (2 pages).
Third Office Action in related Chinese Patent Application No. 201480024299.2 issued Mar. 8, 2018 (7 pages).
International Search Report issued in PCT/CA2014/050324 mailed on Jul. 4, 2014 (4 pages).
Written Opinion of the ISA issued in PCT/CA2014/050324 mailed Jul. 4, 2014 (7 pages).
International Preliminary Report on Patentability from PCT/CA2014/050324 mailed Jul. 28, 2015 (10 pages).
First Examination Report in related Indian Patent Application No. 6672/CHENP/2015 dated Feb. 28, 2020 with English Summary (7 pages).

(Continued)

*Primary Examiner* — Jonathan Johnson
(74) *Attorney, Agent, or Firm* — Lathrop GPM LLP

(57) ABSTRACT

Described is a method of recovering a metal from a substrate having a metal sulphide, metal oxide, or combination thereof, by contacting the substrate with an aqueous oxidant to oxidize the metal sulphide to elemental sulphur and oxidized metal or convert the complex metal oxide to a metal salt, contacting the oxidized metal or simple metal oxide with ammonium hydroxide to form soluble a ammine complex of the metal to obtain a leachate and residual solids; separating the leachate from the residual solids; and recovering the metal.

10 Claims, 4 Drawing Sheets

(56) References Cited

OTHER PUBLICATIONS

First Office Action in related Mexican Patent Application No. MX/a/2015/013796 dated Oct. 10, 2019 with English Summary (6 pages).

Office Action in related Peruvian Patent Application No. 002088-2015/DIN Oct. 4, 2019 with English Summary (8 pages).

Office Action in related Canadian Patent Application No. 2,908,046 dated May 12, 2020 (4 pages).

Second Office Action in related Mexican Patent Application No. MX/a/2015/013796 dated Jul. 13, 2020 with English Summary (8 pages).

* cited by examiner

INTEGRATED RECOVERY OF METALS FROM COMPLEX SUBSTRATES

FIELD OF THE INVENTION

The present invention pertains to the integrated recovery of metals from complex substrates.

BACKGROUND

The global mining industry is under increasing pressure from citizens and governments around the world to shrink its environmental footprint. In addition, mining company shareholders are applying equal pressure for management to increase profits. Currently, the industry relies on concentrating equipment to create a concentrate comprising a substrate or complex mixture of metals and other materials for shipment to a smelter. This process can leave significant amounts of finely ground minerals and/or toxic chemicals in tailings left on the mine site that can leach out into the environment, sometimes for centuries. The tailings are often environmental hazards and costly for mining companies or governments to maintain and/or remediate.

Conventionally, methods for the recovery of different metals and precious metals are entirely different because of the absence of viable technology to efficiently separate precious metals from other metals, as well as metals from one another. As a result, a large number of mining businesses are specifically focused on the recovery of only one specific metal, leading to a loss of other valuable metals even when they are present in significant proportions in the ore or as a by-product of extraction of the main desirable metal.

Smelters are generally used to treat the concentrates produced on mine sites. In the process, the smelters generate significant amounts of airborne pollution comprising greenhouse gases and common air contaminants, as well as toxic smelter slag. Smelters are also expensive to build, at a cost of approximately $1 billion or more for a smelter to treat one metal. In addition, smelters require large amounts of energy to operate, making the ore smelting process energetically expensive. Ore treated in a smelter is sent to a refinery for conversion into a final value added product which in turn creates additional pollution and expense.

The global steel and foundry industries produce approximately 7-8 billion pounds of furnace dust each year. Approximately 22% (1.5-1.8 billion pounds) of the dust is comprised of zinc, with iron and lesser amounts of lead, silver, cadmium, and other metals making up the balance of the waste. The United States Environmental Protection Agency (EPA) classifies the furnace dust as hazardous waste. Worldwide, most of the created furnace dust has been landfilled for more than a century at great economic and environmental cost.

Copper, silver and gold are generally extracted from sulphide ores and are characterized by their unique physicochemical characteristics and are essential commodities for industrial applications outside of their monetary or decorative value. All three metals are also excellent conductors of electricity. Copper is the third most common metal in use, trailing only iron and aluminium. Copper sulphides, in naturally occurring mineral deposits, are normally found in association with sulphides of iron, nickel, lead, zinc and molybdenum and often contain traces of silver and gold. Chalcopyrite is one of the most common ores from which copper is extracted. Copper has wide-ranging applications in, for example, electrical wires, roofing and plumbing and industrial machinery.

The conventional extractive metallurgical processes for extracting copper generally involve pyrometallurgical methods for recovering copper values from copper sulphides. Known recovery processes mostly involve grinding the ore, froth flotation (which selectively separates minerals from gangue by taking advantage of differences in hydrophobicity) to obtain an ore concentrate, and roasting and reduction with carbon or electrowinning. However, such treatment often entails expensive mining and beneficiation process steps to concentrate the sulphides. In addition, the production of copper employing the known technology from sulphidic copper ores produces large amounts of sulfur dioxide, carbon dioxide and cadmium vapor. Smelter slag and other residues of the process also contain significant amounts of heavy metals. Further, strict adherence to environmental regulations governing mining operations may substantially increase the cost of recovering copper from its ores by conventional processes.

Acidic metal leaching and recovery processes can suffer from an array of impurities in the final product, even after successive refining steps. Similarly, alkaline methods almost always suffer from inefficient kinetics and low loading capacity. Also, precious metal extraction often makes use of cyanidation, creating, using and discarding cyanide, one of the most toxic chemicals ever known to mankind.

U.S. Pat. No. 3,967,957 (Fonseca) describes a method of utilizing aqueous ammonia as an oxidative leachant for the recovery of metal values from sulfide ore or sulfide source material. Fonseca teaches the use of oxygen, air, or oxygen bearing gas as an oxidation agent. Oxygen gas has limited solubility in an aqueous system, increasing the amount of time required for oxidation, which can be burdensome on a large scale or for commercial deployment.

U.S. Pat. No. 5,308,381 (Han et al.) describes ammonia extraction of gold and silver from ores and other materials.

There remains a need for a method for recovering metals from complex substrates.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

Described herein is a hydrometallurgical method for selective recovery of metals from complex substrates comprising sulphidic forms of the minerals or metals.

An object of the present invention is to provide a selective leaching and recovery method for recovering metals from substrates metal bearing sulphides, oxides, or a mixture thereof. The substrates can be either in the form of complex metal containing sulphidic minerals, or in the form of sulphide concentrates, oxides, and from a variety of substrates such as, for example, concentrates, tailings, crushed ore or mine sludge.

In accordance with an aspect, there is provided a method for recovering a metal from a substrate comprising a metal sulphide, metal oxide, or combination thereof, the method comprising: contacting the substrate with an aqueous oxidant to oxidize the metal sulphide to elemental sulphur and oxidized metal and/or to convert the metal oxide to metal salt; contacting the oxidized metal with ammonium hydroxide to form a soluble metal ammine complex to obtain a leachate and residual solids separating the leachate from the residual solids; and recovering the metal from one or more of the leachate and the residual solids.

In an embodiment, the aqueous oxidant is selected from the group consisting of a water-soluble peroxide, a water-soluble perchlorate, a water-soluble hypochlorite and ferric iron. In another embodiment, the aqueous oxidant is ferric iron, optionally further comprising an acid.

In another embodiment, the water-soluble hypochlorite is sodium hypochlorite.

In another embodiment, the substrate comprises silver, copper, zinc, gold, lead, or a combination thereof.

In another embodiment, the method further comprises precipitation of the metal from the leachate.

In another embodiment, the substrate is electric arc furnace dust, steel dust, foundry dust, tailings, crushed ore, mine sludge, or a combination thereof.

In another embodiment, the method further comprises, after one or more of steps a)-d), filtering to obtain a solid and a pregnant solution.

In another embodiment, the ammonium hydroxide is at a pH of 9 or above.

In another embodiment, the aqueous oxidant is in an amount sufficient to oxidize all of the metal sulphide and/or metal oxide in the substrate.

In another embodiment, a desired oxidation potential of the aqueous oxidant for steps a) and b) is maintained by reagent addition.

In another embodiment, the substrate comprises lead, and step b) further comprises contacting the oxidized metal with an alkali metal hydroxide in an amount to form soluble alkali metal plumbate.

In another embodiment, the alkali metal hydroxide is sodium hydroxide or potassium hydroxide.

In another embodiment, the method further comprises recycling one or more of the oxidant and the ammonium hydroxide.

In accordance with an aspect, there is provided a method for selective leaching of lead and at least one of silver and copper from a substrate comprising metal sulphides comprising lead sulphide and at least one of silver sulphide and copper sulphide comprising: contacting the substrate with an aqueous oxidant in an amount sufficient to oxidize the metal sulphides to elemental sulphur and oxidized metal; contacting the oxidized metal with an alkali metal hydroxide in an amount sufficient to form soluble plumbate ion and ammonium hydroxide to form a soluble metal ammine complex of at least one of silver and copper to obtain a leachate and residual solids; separating the leachate from the residual solids; and recovering at least one of silver and copper from at least one of the leachate and the residual solids.

In an embodiment, the aqueous oxidant is selected from the group consisting of a water-soluble peroxide, a water-soluble perchlorate, a water-soluble hypochlorite and ferric iron. In another embodiment, the aqueous oxidant is ferric iron, optionally further comprising an acid. In another embodiment, the water-soluble hypochlorite is sodium hypochlorite.

In accordance with an aspect, there is provided a method for recovering a metal from a substrate comprising a metal oxide, the method comprising: contacting the substrate with an aqueous oxidant or lixiviant to convert the metal oxide into a metal salt; contacting the metal salt with ammonium hydroxide to form a soluble metal ammine complex to obtain a leachate and residual solids; separating the leachate from the residual solids; and recovering the metal from one or more of the leachate and the residual solids.

In another embodiment, the aqueous oxidant or lixiviant comprises a water-soluble peroxide, a water-soluble perchlorate, a water-soluble hypochlorite, an acid or a combination thereof. In another embodiment, the water-soluble hypochlorite is sodium hypochlorite. In another embodiment, the substrate comprises silver, copper, zinc, gold, lead, or a combination thereof.

In another embodiment, the method further comprises precipitation of the metal from the leachate. In another embodiment, the substrate is electric arc furnace dust, steel dust, foundry dust, tailings, crushed ore, mine sludge, or a combination thereof. In another embodiment, the method further comprises, after one or more of steps a)-d), filtering to obtain a solid and a pregnant solution. In another embodiment, wherein the ammonium hydroxide is at a pH of 9 or above.

In another embodiment, the aqueous oxidant or lixiviant is in an amount sufficient to oxidize all of the metal oxide to metal salt. In another embodiment, a desired oxidation potential of the aqueous oxidant or lixiviant for steps a) and b) is maintained by reagent addition. In another embodiment, the substrate comprises lead, and step b) further comprises contacting the oxidized metal with an alkali metal hydroxide in an amount to form soluble alkali metal plumbate. In another embodiment, the alkali metal hydroxide is sodium hydroxide or potassium hydroxide.

In another embodiment, the method further comprises recycling one or more of the aqueous oxidant, lixiviant and the ammonium hydroxide.

In another aspect there is provided a metal obtained by one of the described methods. In an embodiment, the metal is silver, copper, zinc, gold or lead.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Definitions

Figure 1:
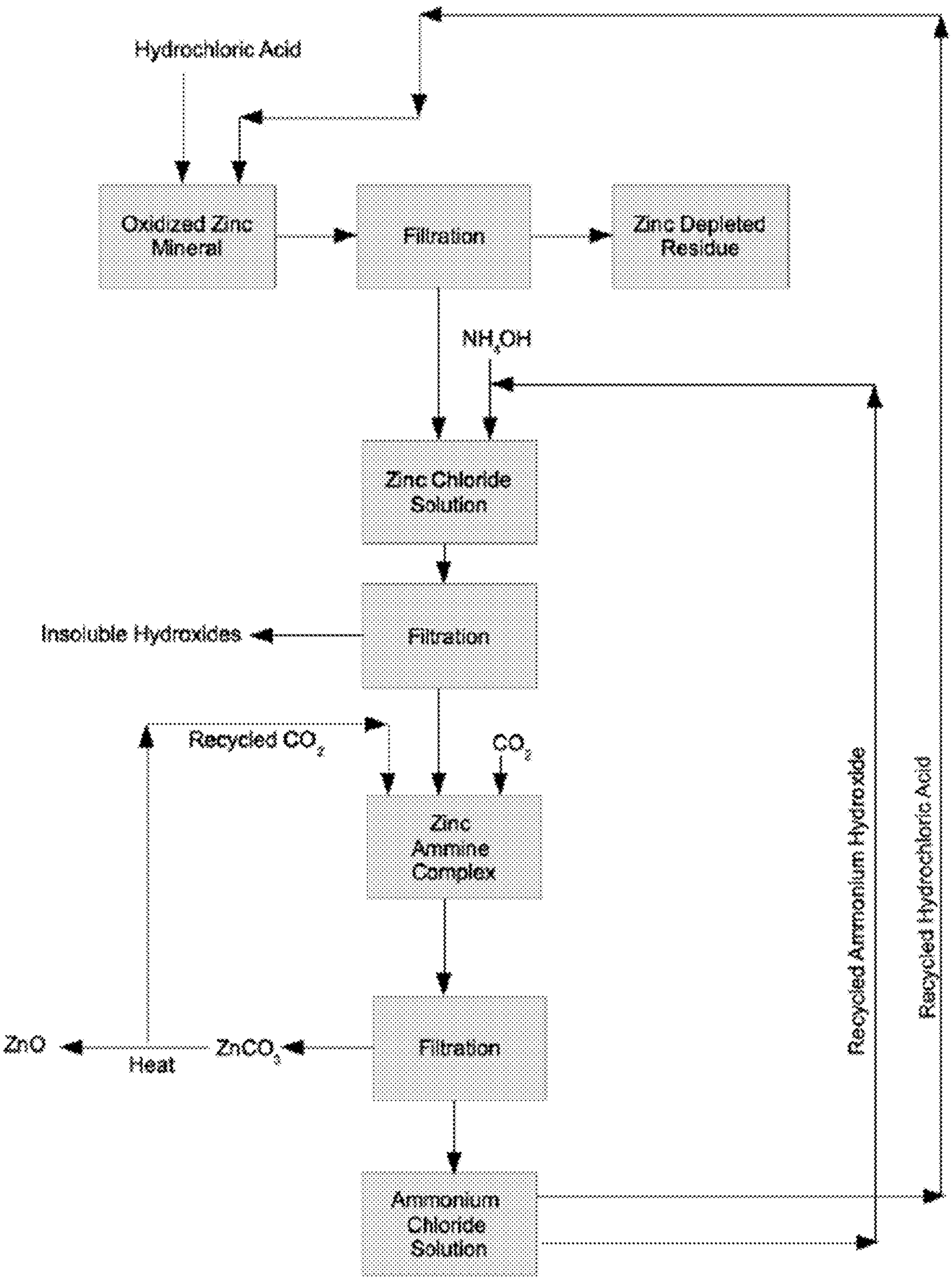
FIG. 1 is a flowchart of an exemplary zinc recovery process.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or elements(s) as appropriate.

As used herein, the term "metal" is as commonly understood, and encompasses any element that would be known to the skilled person as a metal, including valuable metals and precious metals. Some non-limiting examples of metals which can be recovered with the present method include cobalt, copper, iron, gold, lead, molybdenum, manganese, tungsten, platinum, palladium, uranium, nickel, silver and zinc. Preferable metals for recovery using the present method are silver, copper, zinc, gold and lead.

As used herein, the terms "sulphidic mineral" and "metal sulphide" refer to any material comprising a metal in combination with sulfide ($S^{2-}$) as the major anion. Sulphidic minerals can also include selenides, tellurides, arsenides, antimonides, bismuthinides, sulfarsenides and sulfosalts. As used herein, the term "sulphide" is understood to be the same as "sulfide".

As used herein, the terms "oxide", "mineral oxide" and "metal oxide" refer to oxidized forms of minerals or metals other than sulphides, non-limiting examples of which are ferrites, silicates, hydroxides, carbonates and combinations thereof. The term "metal salt" refers to the product of contacting a metal oxide with an aqueous oxidant or lixiviant.

As used herein, the terms "lixiviant" and "oxidative lixiviant" refer to a medium or substance used in hydrometallurgy to selectively extract the desired metal from the ore or mineral into solution. In the present method, the lixiviant is preferably an aqueous lixiviant. The term "lixiviant" is understood to mean an oxidant wherein the oxidative product of reaction with the lixiviant results in a soluble metal salt.

As used herein, the term "oxidant" refers to a chemical capable of oxidizing metal sulphides. An "aqueous oxidant" is an oxidant soluble in water.

As used herein, the terms "substrate" and "complex substrate" refer to a material comprising a mixture of one or more metals and one or more other components, a mixture of one or more metal(s) or mineral(s) in a solid substance, or a combination thereof. The substrate includes mineral or metal oxides and/or mineral or metal sulphides. The "complex substrate" from which the one or more metal can be recovered can comprise a variety of metals in different chemical states, as well as a variety of other non-metal geological materials. Some non-limiting examples of the components that can be present in the substrate are complex sulphides, oxides, ferrites, and silicates. Some non-limiting examples of complex substrates are electric arc furnace dust, steel and foundry dust, tailings, crushed ore and mine sludge. The particle size of the substrate is preferably 100-300 microns. Substrates with larger particle sizes can be ground and/or exposed to the method step(s) for a longer period of time to ensure complete reaction.

As used herein, the term "cementation" refers to a method by which metals are precipitated from a solution in metallic form by using another more reactive metal or metal compound. A sequential process of cementation following the metal reactivity series can result in the sequential extraction of metals from the solution.

Herein is provided a chemical method which can be used to selectively recover both metals and precious metals from complex substrates. This is achieved by an integrated approach of sequentially recovering of metals from the complex substrate.

Metals can be recovered from a sulphidic mineral in a complex substrate by converting the sulphidic mineral to its oxidized form, followed by treatment with ammonium hydroxide to generate a metal ammine complex, and then isolation of the metal by sequential filtration, cementation and dissolution of the oxidized mineral or metal to recover the metal. In the specific case where the complex substrate comprises only mineral or metal oxides, the preliminary oxidation step can be omitted.

The present method exploits the efficiency of acid leaching as well as the selectivity of an alkaline system to sequentially recover metal products in high purity. The combined integrated approach of recovering both metals and precious metals from the same chemical process circuit has the potential to offer a very highly economic and environmentally friendly operation, owing to the to the recovery of multiple metals from one integrated circuit.

The present method can be preferably used for solubilizing and recovery of, for example, silver, copper, zinc, gold and lead from composite sulphidic or oxidic minerals in the ore body, crushed ore or tailings.

Oxidant

The recovery of metals from their sulphides or oxides by hydrometallurgical methods usually necessitates the oxidation of the sulphide ion in the metal sulphide or metal oxide to render the metal soluble and hence recoverable from the solution. It has been found that the sulphide in the sulphidic minerals can be oxidized to elemental sulphur, hence the oxidation potential of the oxidant in the leach solution is adjusted such that it is insufficient to oxidize the sulphide to the hexavalent state. Metal oxides can also be converted to a more soluble oxidized metal form such as, for example, a metal salt. The oxidation potential of a reagent is understood to mean the power of the reagent to remove electrons and it may be expressed quantitatively in millivolts. Sulphides and oxides can be treated with the oxidant at ambient temperature and pressure. Alternatively, in some cases temperature and pressure can be changed to optimize or speed up the metal recovery process.

To convert a sulphidic mineral or metal or a metal oxide from a complex substrate into its oxidized form, an oxidant is used. When reaction of the sulphidic mineral or metal or metal oxide with the oxidant results in a soluble aqueous metal salt, the oxidant is an oxidative lixiviant. A variety of oxidants can be used in the present method. The oxidant can be selected from the group consisting of an oxygen-containing gas, a water-soluble peroxide, a water-soluble perchlorate, a water-soluble hypochlorite and ferric iron. The oxidation can also be carried out by electro-oxidation.

The oxidant can be selected from the group consisting of a water-soluble perchlorate and a water-soluble hypochlorite. Preferably, the oxidant is a hypochlorite in a concentration sufficient either to oxidize all of the sulphides present, or to convert it into simple oxide if the mineral is a complex metal oxide. Preferably, the oxidant is an alkali metal hypochlorite such as sodium or potassium hypochlorite. One preferable oxidant is sodium hypochlorite. In the case where sodium hypochlorite is used as an oxidant to oxidize sulphide in the composite mineral to elemental sulphur, the oxidized mineral reacts with sodium chloride to form soluble chloride complexes, which is subsequently treated to recover metals. The oxidant can also be other hypochlorite, chlorate or perchlorates salts such as, for example, the hypochlorite, chlorate or perchlorate salts of sodium, potassium, calcium or other alkali and alkaline metals. In one example of the present method for leaching at least one of silver and copper from at least one of silver sulphidic and copper sulphidic minerals, by sodium hypochlorite is used as the oxidant.

The oxidant can also be selected from the group consisting of ferric salts, for example, ferric chloride, ferric nitrate, ferric sulphate, ferric fluorosilicate, ferric fluoroborate, together with the salt acid such as, for example, hydrochloric acid, nitric acid, sulphuric acid, fluorosilicic acid, fluoroboric acid and acetic acid. Ferric iron can be effectively used as an oxidant to convert sulphidic mineral to their oxidized forms followed by the dissolution of oxidized mineral in an acid to recover target metals. Generally, a stoichiometric or greater than stoichiometric quantity can be used to ensure that the reaction is complete.

In one particular example of a complex substrate comprising a mixture of zinc, lead and silver in sulphide, or mixed oxide and sulphide forms, treatment of the substrate with a chlorinated aqueous oxidant converts the metals into their chloride salts as follows:

$$\text{Mixture of Zn/Ag/Pb} \rightarrow ZnCl_{2(aq)} + PbCl_{2(aq)} + AgCl_{(s)}$$

Oxidized forms of some minerals, for example, ferrites, silicate, oxides, hydroxides, carbonates and combinations thereof do not require the use of ferric iron as an oxidant and can be dissolved in hydrochloric acid alone to obtain the metal chloride salt. During the dissolution process, ferric iron is reduced to ferrous iron, which is precipitated, and can be recovered and subsequently oxidized back to ferric iron for further leaching. As a result, the overall process can run as a closed-loop operation.

In the case of silver and lead, treatment with an chlorinated oxidant results in the formation of insoluble chlorides. In this case, the oxidant is an oxidative lixiviant for the soluble metal chlorides, and simply an oxidant for the insoluble metal chlorides since these are insoluble in the aqueous media. Silver and lead form insoluble chlorides because of their limited solubility and mostly remain in the residue after the leaching whereas zinc, gold, copper, nickel, cobalt and molybdenum dissolve to form soluble chlorides.

An oxidant or oxidative lixiviant can be used for oxidation of the sulphidic mineral. The oxidant can also be electrochemically regenerated for further leaching. As a result, the overall process can run as a closed-loop operation. Moreover, use of the oxidant has been found to convert complex silver and copper oxide ores, for example silicates, with low amenability to direct leaching in ammonia into an easily leachable oxidized form. Further, when using an aqueous oxidant, such as sodium hypochlorite for example, there is no requirement for high pressure or increased temperature, thus reducing the energetic and financial cost of the overall recovery process. In the case where reaction of the oxidant with the metal suphide results in formation of soluble aqueous metal salts, the oxidant is considered to be an oxidative lixiviant.

Ammonium Hydroxide

Once the sulphide or oxide in the metal or mineral of the complex substrate has been oxidized by the oxidant to an oxidized metal, an aqueous solution of ammonium hydroxide is used to dissolve the metal to generate metal ammine complexes. Ammonium hydroxide can be used to form a variety of metal ammine complexes. In one example, silver and copper can be formed as ammine complexes with ammonium hydroxide after oxidation of the sulphidic minerals by sodium hypochlorite.

The amount of ammonium hydroxide required to form silver or copper ammine complex is calculated based on the initial content of the target metal present in the substrate. For example, based on the mole ratio, one mole of silver requires two moles of ammonia to form soluble silver ammine complex, which translates to approximately 34.06 g of ammonia for 107.86 g of silver. The concentration of ammonium hydroxide and reaction stoichiometry can be adjusted for optimal recovery. Preferable concentrations of ammonium hydroxide used can range from 1M-6M, more preferably from 1M-3M.

In the situation where the oxidant and ammonium hydroxide are chemically compatible, it is conceivable that the oxidation step with the oxidant and leaching step with ammonium hydroxide can be performed simultaneously. In this case, a composition can be provided for the two step method as a single composition comprising both the oxidant and the ammonium hydroxide.

The sulphide bearing minerals in the ore are can also be brought into contact with ammonium hydroxide at high pH subsequent to oxidation by hypochlorite. In one case the pH is 7 to 14. Preferably, the pH is 9 or above. The leach solution then reacts with the oxidized minerals to attain a high metal ion concentration in the leachant. This can improve the economy of the leaching process as determined by the kinetics of the process. The pregnant solution containing the dissolved value metals, in particular at least one of solubilized silver and copper, are recovered from the leach solution by precipitation. The ammonium hydroxide reagent utilized in the leaching process is relatively environmentally benign. Preferably, the ammonium hydroxide is entirely recycled in the process. Further, the leaching step with ammonium hydroxide can be conducted at ambient temperature and pressure, reducing the energy required for metal extraction.

General Method

The flowchart in FIG. 1 shows an exemplary process for the recovery of zinc from an oxidized mineral. As shown, oxidized zinc mineral is reacted with hydrochloric acid to obtain zinc chloride in a leachate solution which is separated by filtration from a zinc depleted residue. The leachate is then reacted with ammonium hydroxide to obtain a soluble zinc ammine complex which is separated by filtration from insoluble hydroxides. The zinc ammine complex leachate is bubbled through with carbon dioxide to form insoluble zinc carbonate which can be separated from the supernatant by filtration. Thermal decomposition of the zinc carbonate provides zinc oxide. Carbon capture and sequestration techniques can be used to capture the carbon dioxide. At the end of the process, the waste ammonium chloride solution can be converted back into ammonium hydroxide and hydrochloric acid for recycling. The carbon dioxide driven off of the zinc carbonate can also be recaptured for recycling.

Figure 2:
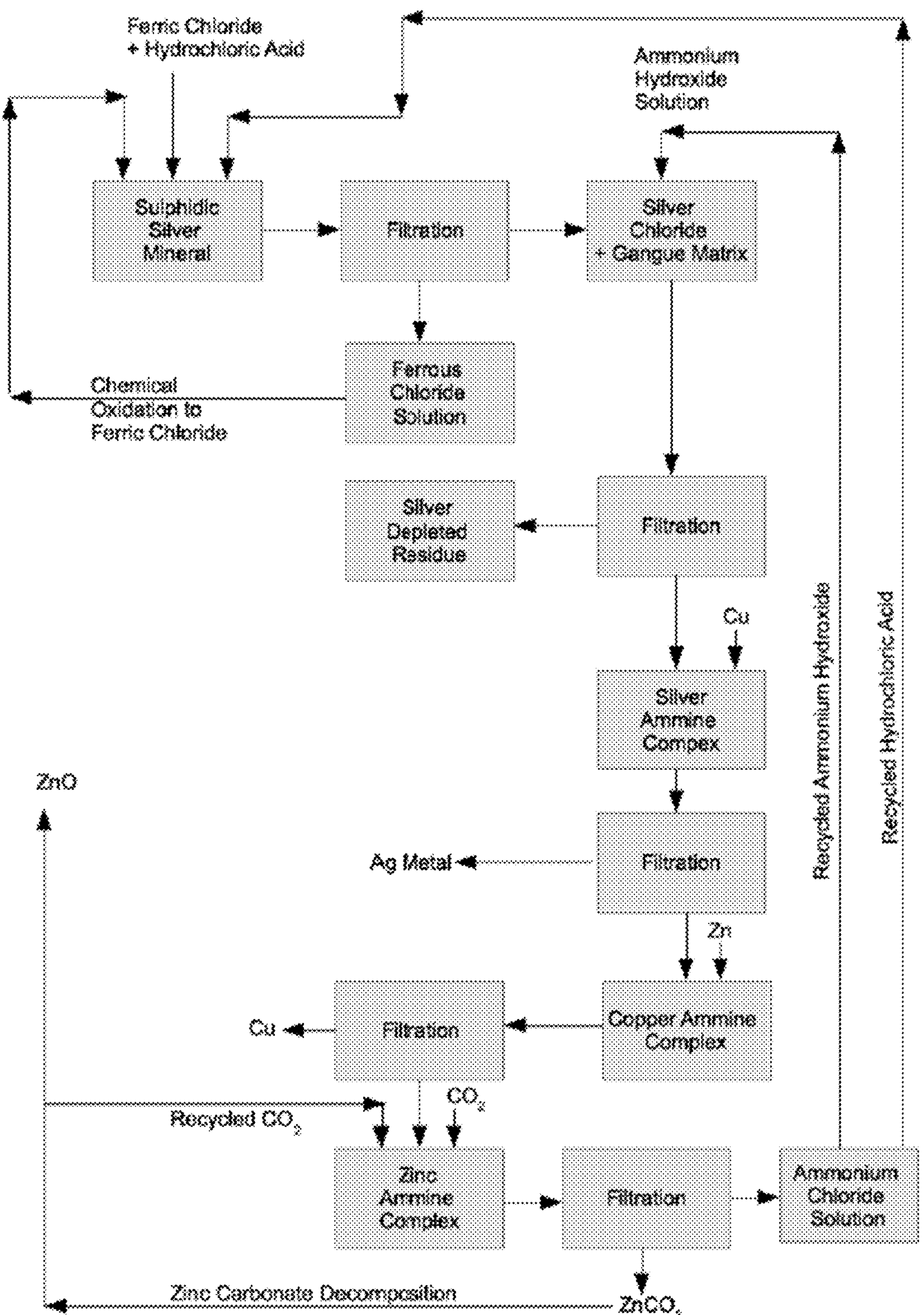
FIG. 2 is a flowchart of an exemplary silver recovery process.

The flowchart in FIG. 2 shows an exemplary process for the recovery of silver from a sulphidic silver mineral. The complex substrate is contacted with an aqueous solution of ferric chloride and hydrochloric acid which serves as the oxidant. The resulting leachate is filtered to separate a solution of ferrous chloride from insoluble silver chloride. The ferrous chloride solution can be oxidized back to ferric chloride by chemical oxidation for recycling of the ferric chloride. The silver chloride and gangue matrix filtrate is then reacted with ammonium hydroxide to give a soluble silver ammine complex in solution, which is filtered to remove a silver depleted residue. The silver ammine complex is then reacted with copper to give silver metal, which is then removed from the copper ammine solution by filtration. The copper ammine complex can then be reacted with zinc metal to retrieve the copper by precipitation and filtration, which then leaves the copper to be recirculated back into the silver recovery process. The supernatant comprising zinc ammine complex can then be bubbled through with carbon dioxide gas to generate zinc carbonate as a precipitate which is then removed from the supernatant by filtration, leaving ammonium chloride in solution. The ammonium chloride can then be regenerated to hydrochloric acid and ammonium hydroxide for recycling back into the process to complete the process circuit. Finally, zinc carbonate is converted to zinc oxide by thermal decomposition. The carbon dioxide can then be recycled back into the zinc recovery step of the process.

To convert the bulk of the metal sulphide or metal oxide in a complex substrate into a soluble form, an aqueous composition is described comprising an oxidant or oxidative lixiviant capable of solubilizing at least one of silver, copper, gold, zinc, lead, cobalt and nickel from either sulphide-containing sulphidic minerals or their oxidized forms. The aqueous composition to treat the metal sulphides and/or metal oxides in the complex substrate comprises an oxidant or oxidative lixiviant in an amount to oxidize the sulphur from the sulphides to elemental sulphur. In one preferable embodiment, the aqueous lixiviant/oxidant comprises a hypochlorite in an amount to convert the metal suphide and/or metal oxide present into soluble metal chloride complexes. Due to the low solubility of many silver salts, the oxidant is not always a lixiviant for silver salts, and this difference in solubility should be taken into account when using the present method to recover silver.

The composition can be provided as a combination composition when the oxidative lixiviant or oxidant is chemically compatible with the ammonium hydroxide. Specifically, in the case where the oxidant and ammonium hydroxide do not react, the two can be combined and the oxidative process and conversion of the oxidized metal to metal ammine complexes can be carried out in a single step. However, it is preferable to provide the aqueous oxidant and the ammonium hydroxide as two separate compositions for sequential treatment of the complex substrate.

The aqueous oxidant reacts with the sulphidic minerals or their oxidized forms to attain high metal ion concentration to render the leaching process economical as determined by the kinetics of the method. The dissolved metals in the pregnant solution are recovered sequentially from the leach solution by precipitation. The leaching process can be conducted at ambient temperature and pressure. Increased temperature has also been found to enhance the kinetics of the leaching process.

In the case where sodium hypochlorite or ferric chloride is used as an oxidant to oxidize sulphide in the composite mineral to elemental sulphur, the oxidized mineral reacts with sodium chloride to form soluble chloride complexes, which is subsequently and sequentially treated as described above to recover the desired metals. Sodium hypochlorite in particular has been found to be very effective for use as an oxidant to oxidize sulphide in a composite or complex substrate mineral to mainly elemental sulphur.

If lead sulphide is present in the original mixture, lead oxide or lead chloride formed by treatment with sodium hypochlorite can be reacted with sodium hydroxide to form soluble sodium plumbate which is subsequently treated to recover lead as high purity lead carbonate. Preferably, the resulting leachate is substantially free of lead after an extended contact time. Lead carbonate can be easily converted to other lead products based on end-user requirements. The lead depleted residue is washed with water and treated with ammonium hydroxide to dissolve at least one of silver and copper as ammine complexes and recovered as at least one of pure silver metal and copper compound. Copper compound thus formed can be easily converted into any other copper products based on end-user needs.

Unconsolidated minerals containing lead sulphide and at least one of silver sulphide and copper sulphide, including discrete blocks of rocks and agglomerated ore particles and concentrate, agglomerated and unagglomerated sulphide bearing mill tailings of mineral beneficiation and similar sulphide containing by-products and waste products of recycling processes, can be leached ex-situ with an oxidant, and the ammonium hydroxide sequentially. The pregnant leach solution obtained by dissolving the oxidized form of the mineral in ammonium hydroxide is treated for desired metal recovery. In the case of lead recovery, the oxidant and alkali hydroxide lixiviant can be used simultaneously or sequentially. The leaching process can also be used if lead sulphide is not present in the unconsolidated minerals. Optionally, the process can also include regenerating the oxidant used in the process as described above.

The desired oxidation potential of the aqueous oxidant can be maintained by reagent addition. The desired alkali metal hydroxide content of the oxidant/lixiviant can be maintained throughout the leaching process. Preferable alkali metal hydroxides are sodium hydroxide and potassium hydroxides. It has been observed that the majority of the oxidation of the mineral can occur within 15-30 minutes. The contact time can also be extended to attain desired recovery, or to accommodate decreased surface area of the substrate particles.

In use, the present method does not require preconcentration of the minerals, which may require costly mining expenditures and equipment. The process also avoids acid drainage problems and also uses relatively environmentally benign reagents. Since iron does not dissolve under alkaline conditions, the process can also recover metals from iron containing complex minerals as high purity products. Other advantages include relatively fast kinetics, high silver recovery efficiency and avoidance of the use of the current industry standard approach of cyanidation. Other complex sulphides and oxides containing gold, nickel, cobalt and molybdenum in addition to copper, silver, lead, zinc and iron can also be treated by the process proposed herein.

In one embodiment, the present process can be used to treat furnace dust waste. Tests of the present process indicate that selectively recovery of up to and greater than 99% of the zinc in a complex substrate can be obtained as a high purity product ready for industrial use. Preliminary engineering projections indicate that a plant to treat the furnace dust on site would pay for itself in less than 2 years and create an ongoing revenue stream for the foundry. The process could also be used to treat and recover other metals in furnace dust to further improve revenues and provide a recycling solution for the steel and foundry industry.

The present process also has the potential to improve profits while eliminating most of the above ground equipment that causes expense and pollution problems for the mining and metal recovery industry. The present process eliminates the need for concentrating, smelting and traditional refining and yet is able to recover as much as 80%, 90%, and up to and greater than 95% of certain metals in a value added form. The process technology can also be housed in a single plant built on the mine site and scaled to the size of the mining operation.

In one example, the present method can be used for selective leaching of at least one of silver and copper from a complex substrate comprising at least one of copper sulphide and silver sulphide, the process comprising: contacting the complex mixture with an aqueous oxidant in an amount sufficient to oxidize the metal sulphide to elemental sulphur and oxidized metal; contacting the oxidized metal with ammonium hydroxide in an amount sufficient to form soluble ammine complexes of at least one of copper and silver sequentially; extending the contact time between the oxidant and solids to give the desired recovery of at least one of silver and copper and selectivity in the leachate while maintaining operative reagent concentrations; separating the desired leachate from the residual solids; and recovering at least one of copper and silver from the leachate.

An aqueous lixiviant composition can be used to solubilize at least one of silver and copper selectively from mixtures and ores containing at least one of silver sulphide and copper sulphide, comprising: an oxidant selected to oxidize the sulphur from the sulphides only to the elemental sulphur stage; and ammonium hydroxide selected to form soluble ammine complexes of at least one of silver and copper from at least one of silver sulphide and copper sulphide oxidation products.

When the starting solids contain lead sulphide, the process can be carried out sequentially by recovering the lead, employing sodium hydroxide to form soluble plumbate followed by treatment of the washed residue with ammonium hydroxide to dissolve at least one of silver and copper as ammine complexes. In one example, the method for selective leaching of lead and at least one of silver and copper from a complex mixture or ore containing lead sulphide and at least one of silver sulphide and copper sulphide comprises:

a. contacting the complex mixture or ore sequentially with an aqueous oxidant followed by a lixiviant to obtain a leachate, the lixiviant comprising:
   1) an oxidant selected to in an amount sufficient to oxidize the sulphide present only to elemental sulphur,
   2) an alkali metal hydroxide in an amount sufficient to form soluble plumbate ion and
   3) ammonium hydroxide in an amount sufficient to form a soluble ammine complex of at least one of silver and copper;
b. extending the contact time between lixiviant and solids mixture or ore to give the desired recovery of at least one of silver and copper in the leachate while maintaining operative reagent concentrations;
c. separating the desired leachate from the residual solids;
d. recovering at least one of silver and copper from the leachate, and
e. optionally regenerating the lixiviant used in the process.

The aqueous lixiviant or oxidant can be provided in composition capable of solubilizing lead and at least one of silver and copper selectively from mixtures and ores containing lead sulphide and at least one of silver sulphide and copper sulphide, the aqueous lixiviant composition comprising: an oxidant selected in an amount to oxidize the sulphur from the sulphides only to the elemental sulphur stage; an alkali metal hydroxide in an amount selected to form a soluble alkali metal plumbate from a lead sulphide oxidation product; and ammonium hydroxide in an amount selected to form soluble ammine complexes of at least one of silver and copper from at least one of silver sulphide and copper sulphide oxidation products.

Metal Recovery with Sodium Hypochlorite as Oxidant

Lead Recovery

On exemplary chemistry that can be used in the sequential leaching of lead followed by the recovery of at least one of silver and copper in alkaline leaching process is as follows:

1. Chlorine and sodium hydroxide are produced by electrolysis of aqueous sodium chloride solution.

$$2NaCl+2H_2O \rightarrow Cl_2+H_2+2NaOH$$

2. Sodium hypochlorite is produced by mixing chlorine with sodium hydroxide.

$$4Cl_{2(g)}+8NaOH \rightarrow 4NaClO+4NaCl+4H_2O$$

3. Sodium hypochlorite reacts with lead sulphide in presence of sodium hydroxide to produce soluble sodium plumbate, sodium chloride and elemental sulphur.

$$NaClO+PbS_{(s)}+NaOH \rightarrow NaPbOOH+NaCl+S^0$$

4. Soluble sodium plumbate produced in step 3 is treated with carbon dioxide gas to precipitate insoluble lead carbonate.

$$NaPbOOH+NaOH+2CO_{2(g)} \rightarrow PbCO_{3(s)}+Na_2CO_3+H_2O$$

5. Sodium hydroxide is regenerated by treating sodium carbonate produced in step 4 with quick lime.

$$CaO+H_2O+Na_2CO_3 \rightarrow CaCO_{3(s)}+2NaOH$$

6. Calcium carbonate produced in step 5 is calcined to regenerate quick lime and carbon dioxide gas, which are recycled.

$$CaCO_3 \rightarrow CaO+CO_2$$

A bleed solution is intermittently treated to remove the impurities built up during the leaching process.

Silver and Copper Recovery

The lead depleted residue containing at least one of oxidized silver and copper is washed with water and treated with ammonium hydroxide solution to dissolve at least one of silver and copper at least one of silver and copper ammine complexes.

The treatment of silver bearing minerals with hypochlorite led to oxidative (for sulfides) or non-oxidative (for non-sulfide) conversion of contained silver in the silver ore to silver chloride. The high recovery efficiency of silver is attributable to rapid dissolution of silver chloride in ammonia solution to form soluble silver ammine complex according to the following equation.

$$Ag^+_{(aq)}+2NH_{3(aq)} \rightarrow Ag(NH_3)_2{}^+_{(aq)}$$

Similarly, copper minerals were converted to either copper oxide or copper hydroxide, which readily dissolve in ammonia to form a soluble copper ammine complex.

$$CU^{2+}_{(aq)}+4NH_{3(aq)} \rightarrow Cu(NH_3)_4{}^+_{(aq)}$$

Silver can be precipitated as metallic silver by employing either copper or copper compounds. Ammonia can be recovered by steam stripping and recycled for further use. Copper can be precipitated as either copper metal, copper hydroxide or copper carbonate.

The oxidative dissolution involved in the leaching of silver sulphide with a hypochlorite such as sodium hypochlorite is given below. Similar chemistry was observed with all the aforementioned metals because of the soluble metal chlorides or metal chloride complexes formed during the leaching process.

$$Ag_2S_{(s)}+4Cl^-_{(aq)} \rightarrow 2AgCl_{2(aq)}$$

Silver can be either electrolytically deposited or precipitated as metallic silver by reduction employing copper or zinc. The oxidative lixiviant can then be electrochemically regenerated. Because of the significant differences in reactivity, dissolved metals can be sequentially recovered either by reduction to metallic state or precipitation.

In another example, an aqueous lixiviant composition is selected to solubilize at least one of silver and copper selectively from complex mixtures and ores containing at least one of silver sulphide and copper sulphide, comprising:

1) an oxidant selected in an amount sufficient to oxidize the sulphur from the sulphides only to the elemental sulphur stage; and 2) ammonium hydroxide in an amount sufficient to form soluble ammine complexes of at least one of silver and copper from at least one of silver sulphide and or copper sulphide oxidation products.

Metal Recovery with Ferric Iron as Oxidant

A variety of ferric salts in combination with their associated salt acids can be used as the lixiviant or oxidant. Some non-limiting examples of these include: ferric chloride/hydrochloric acid; ferric sulphate/sulfuric acid; ferric nitrate/nitric acid; ferric perborate/boric acid; and ferric fluorosilicate/silicic acid. One preferable ferric salt/acid combination is ferric chloride and hydrochloric acid. When the substrate comprises no metal sulphides and only metal oxides, only hydrochloric acid is required. The steps involved in the process of recovering at least one each of metals and precious metals from a complex mixture comprising metal sulphides using ferric iron is as follows.

In the following example, ferric chloride in combination with hydrochloric acid is exemplified as the oxidative lixiviant or oxidant. In the case where the metal substrate comprises no metal suphides and only oxidized metals, ferric iron treatment can be omitted and the metal oxides can be converted directly to their associated metals salts.

1. A mixture of ferric chloride in combination with hydrochloric acid dissolves the target metals from sulphidic minerals. This step converts the contained target metals into their respective chlorides. Metal sulphides of other metals such as gold, nickel, cobalt, molybdenum, silver, copper and cobalt can also be converted from their sulphide form in a similar reaction.

$$ZnS+2Fe^{3+} \rightarrow Zn^{2+}+2Fe^{2+}+S^0$$

2. Silver chloride primarily remains in the residue, attributable to its limited solubility. Zinc, gold, nickel, cobalt, molybdenum and copper, however, dissolve in the lixiviant to form their respective soluble chlorides.
3. The residue is separated from the leachate by filtration and washed with water.
4. The washed residue is treated with ammonium hydroxide to produce soluble silver ammine complex, which is separated from the residue by filtration.

$$AgCl+2NH_3 \rightarrow Ag[(NH_3)_2]^++Cl^-$$

5. Silver is then precipitated as pure metallic silver by cementation with copper.

$$Ag^++Cu \rightarrow Cu^{2+}+Ag$$

6. Copper used for the precipitation of metallic silver is recovered by cementation with zinc.

$$Cu^{2+}+Zn \rightarrow Zn^{2+}+Cu$$

7. Zinc is precipitated as zinc carbonate by preferably bubbling carbon dioxide gas through the solution. Alternatively, other carbonate ions source, for example, alkali metal carbonates, can be employed for this purpose.

$$2[Zn(NH_3)_4]^{2+}+4H_2O+CO_3^{2-} \rightarrow Zn(OH)_2 \cdot ZnCO_3+4NH_4^++2OH^-$$

$$Zn^{2+}+CO_3^{2-}ZnCO_3$$

8. Ammonia and hydrochloric acid can then be regenerated from the ammonium chloride solution left behind after the recovery of silver, copper and zinc. In one example, magnesium oxide is used to regenerate the ammonium chloride to obtain ammonia, water and hydrochloric acid.

$$MgO+2NH_4Cl \rightarrow MgCl_2+2NH_3+H_2O$$

$$MgCl_2+H_2O \rightarrow MgO+2HCl$$

9. The leachate obtained in step 3 can then either be evaporated to reduce the volume of solution or directly treated with ammonium hydroxide to form soluble zinc ammine complex. Iron is precipitated as iron hydroxide during this step.

$$Zn^{2+}+4NH_3 \rightarrow [Zn(NH_3)_4]^{2+}{}_{(aq)}$$

$$FeCl_2+2NH_4OH \rightarrow Fe(OH)_{2(s)}+2NH_4Cl$$

10. Soluble zinc ammine complex is then separated from the precipitated ferrous hydroxide by filtration.
11. Zinc is then precipitated from the filtrate as high purity zinc carbonate using carbon dioxide gas as outlined in step 7 above.
12. Ammonia and hydrochloric acid can be regenerated as outlined in step 8 above.
13. Ferrous hydroxide residue from step 10 can then be dissolved in the regenerated hydrochloric acid to form soluble ferrous chloride and subsequently oxidized to ferric iron by ozone (shown below), oxygen or air for recycling.

$$O^{3-}+Fe^{2+}+H_2O \rightarrow O_2+Fe^{3+}+2OH^-$$

14. Zinc carbonate is then heated to drive off carbon dioxide gas, thus converting it to high purity zinc oxide. The decomposition of zinc carbonate, $ZnCO_3(s)$, into zinc oxide, $ZnO(s)$, and $CO_2(g)$ at ambient pressure generally requires the addition of 71.5 kJ of heat per mole of $ZnCO_3$. Carbon dioxide gas released during the thermal decomposition of zinc carbonate is channelled to the zinc carbonate precipitation step above for recycling.

$$ZnCO_3 \rightarrow ZnO+CO_2$$

Treatment of metals with hydrochloric acid, optionally in combination with ferric chloride when the metal is at least partially in sulphide form, is preferable since chlorides and chloride complexes have high solubility in aqueous systems, thus very high loading capacity is readily attainable.

EXAMPLES

To gain a better understanding of the invention described herein, the following example is set forth. It should be understood that these examples are for illustrative purposes only. Therefore, they should not limit the scope of this invention in any way.

Example 1

A column test was conducted to simulate leaching. Approximately 120 g crushed ore containing composite lead, silver and copper sulphidic minerals was lightly ground with a mortar/pestle and packed in a 1.27 cm-ID (internal diameter)×51 cm-long clear vinyl tube. Small plugs of glass wool were placed on the ends of the tubing, acting as particulate filters as the liquid passed through the column. Tapping the sides of the column ensured uniform packing. Prior to leaching, $N_2$ sparged deionized water was pumped through the column to remove any entrapped air. The deionized water was left in the sealed column overnight.

Figure 3:
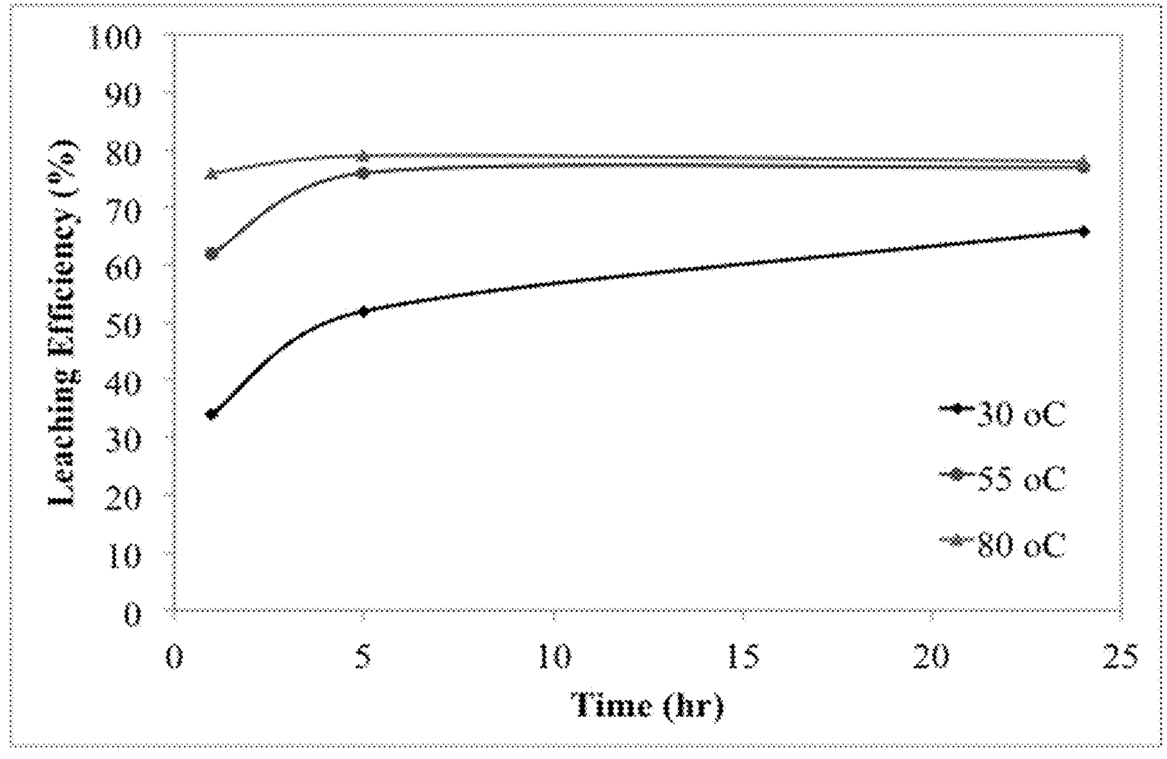
FIG. 3 depicts the silver leaching efficiency against time from sulphidic ore sample described in Example 2.

The oxidant sodium hypochlorite (0.48M NaOCl) was pumped upward through the column, at relatively constant flow rate using a peristaltic pump. The target flow rate was 1 ml/min, translating into approx 20 minutes residence time in the column. The actual average flow rate throughout the testing period was 1.05 ml/min. The column was then washed with 50 ml of water. Comparative analysis of the hypochlorite (0.48M) treated residue compared to the initial sample for a sulfide based mineral showed the oxidative conversion of silver sulfide to silver chloride as shown in FIG. 3. X-ray diffraction patterns were analyzed for this purpose to compare the existence of mineral phases. Presence or absence of peak intensity from x-ray diffraction patterns indicates the presence or absence of a particular mineral phase qualitatively.

a) Lead Recovery

2 M NaOH was then pumped upward through the column, at relatively constant flow rate using a peristaltic pump. The target flow rate was 1 ml/min, translating into approx 20 minutes residence time in the column. The actual average flow rate throughout the testing period was 1.05 ml/min. The effluent was collected every thirty minute and quantitatively analyzed by ICP-MS for the concentration of dissolved lead in the solution. The experiment was continuously run until there was no increase in the concentration of lead in effluent. Following the completion of lead leaching, the column was again washed thoroughly with water until the effluent was completely free of dissolved lead. The washings were also analyzed for the lead content.

b) Silver and Copper Recovery

Ammonium hydroxide ($NH_4OH$, 1.35 M) was then pumped upward through the column using a peristaltic pump at a target flow rate of 1 ml/min, translating into approx 20 minutes residence time in the column. The actual average flow rate throughout the testing period was 1.05 ml/min. The effluent was collected every thirty minutes and quantitatively analyzed by Inductively coupled plasma mass spectrometry (ICP-MS) to determine the concentration of dissolved silver and copper in the solution. The experiment was continuously run until there was no increase in the concentration of silver and copper in the effluent. Following the completion of silver and copper leaching, the column was again washed thoroughly with water until the effluent was completely free of dissolved silver and copper. The washings were also quantitatively analyzed for the amount of silver and copper.

Example 2

20 g of crushed sulphidic silver ore samples was treated with 400 ml of 0.5 M sodium hypochlorite solution. The mixture was continuously stirred with a magnetic stirrer. The experiments were performed at 30° C., 55° C. and 80° C. for a period of 24 hours. The residue was separated from the solution by filtration and treated with 2M ammonium hydroxide to form soluble silver ammine complex. The amount of ammonium hydroxide required to dissolve silver was calculated on the basis of the original metal content. Aqueous supernatant samples were collected every thirty minute and analyzed for the dissolved silver content. The experiment was run until there was no increase in the amount for dissolved silver in the solution as quantitatively determined by ICP-MS.

Figure 4:
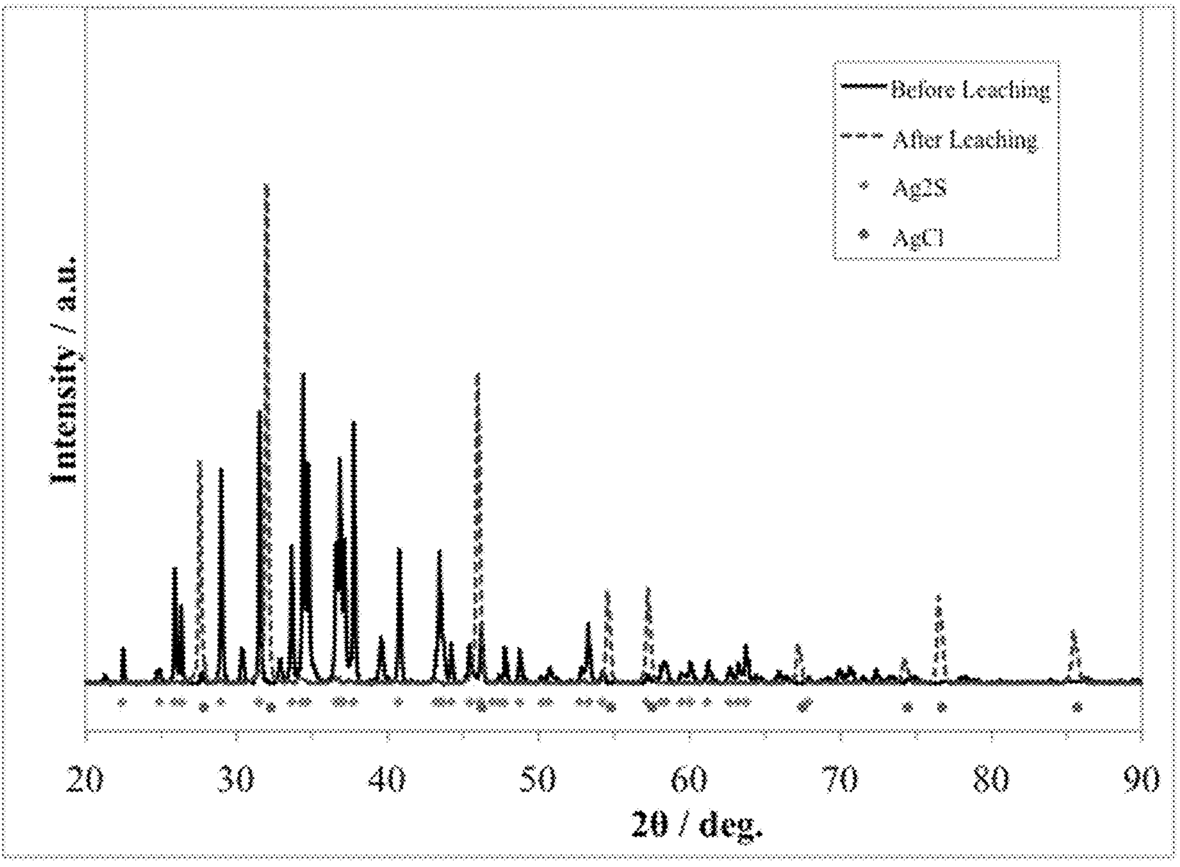
FIG. 4 depicts the kinetics of silver extraction from a sulphidic ore sample at various temperatures described in Example 2.

Silver was recovered from the leachate thus obtained by cementation with copper. The results from silver extracted from oxide-based head ore samples containing ca. 300 g/t silver at various temperatures is shown in Table 1. Shown in FIG. 4 is the silver leaching efficiency against time from sulphidic ore sample at 30° C., 55° C. and 80° C.

TABLE 1

| Temperature | Silver Recovery Efficiency |
|---|---|
| 30° C. | 82% |
| 55° C. | 89% |
| 80° C. | 92% |

Similar experiments with sodium hypochlorite were repeated with complex oxidized form of the silver containing minerals, for example, silicates and ferrites, which were not directly amenable to leaching with ammonia. These silver bearing minerals were directly treated with 2M ammonium hydroxide solution. Silver recovery without the use of hypochlorite as an oxidative lixiviant was less than 1% in comparison to the results of Table 1 above for the same sample used where the samples were first treated with sodium hypochlorite followed by ammonium hydroxide.

The kinetics of silver extraction at various temperatures from a sulphidic ore sample is shown in Table 2. The leaching efficiency at various time intervals was determined by collecting aqueous supernatants at 1, 5 and 24 hours and the metal content in the solution was quantitatively determined employing ICP-MS to ascertain the recovery efficiencies.

TABLE 2

| Time | 30° C. | 55° C. | 80° C. |
|---|---|---|---|
| 1 hr | 34% | 62% | 76% |
| 5 hr | 52% | 76% | 78% |
| 24 hr | 66% | 77% | 79% |

Example 3

Approximately 120 g crushed ore, containing composite silver, copper, gold, zinc, lead, cobalt and nickel containing sulphidic minerals was lightly ground with a mortar/pestle and placed in a beaker. The oxidative lixiviant (0.79M NaOCl, 720 ml) was poured into the beaker containing the composite mineral sample and stirred continuously for 24 hours. The volume of hypochlorite was added to maintain a solid-liquid ratio of 1:5. Aqueous samples of the supernatant were collected every thirty minutes and quantitatively analyzed for silver concentration using ICP-MS. Percent recovery is calculated based on the difference in the amount of silver recovered against the initial silver content. All samples were quantitatively analyzed by ICP-MS for the initial metal content prior to their use in any of the experiments. The results are shown in table 3 below.

TABLE 3

| Ore Sample | Sample Analyzed | Silver Recovery |
|---|---|---|
| A17 | Leached Solid | 91% |
| A17 | Pregnant Leach Solution | 95% |
| A18 | Leached Solid | 88% |
| A18 | Pregnant Leach Solution | 87% |

Example 4

20 g of a crushed sulphidic mineral sample containing silver, zinc, copper, cobalt, nickel, gold and molybdenum metals was mixed with 400 ml of an aqueous solution of 1M ferric chloride and 0.5M hydrochloric acid in a beaker. The amount of oxidant was calculated based on the initial metal content and over-stoichiometric quantity was employed to ensure complete oxidation of sulphides. The mixture was continuously stirred for a period of 24 hours. 10 ml of aqueous supernatant samples were collected from the beaker every thirty minutes to assess the kinetics of leaching. The samples were filtered to separate the residue from the leachate. The leachate was then quantitatively analyzed by ICP-MS to determine the metal content. After 24 hours, the final leachate was separated from the residue by filtration.

a) Silver Recovery

The residue was treated with a stoichiometric quantity of 2M ammonium hydroxide to dissolve silver chloride formed during the leaching to soluble silver ammine complex based on the metal content determined by ICP-MS analysis. Stoichiometry was determined by the number of moles of ammonia required to dissolve silver chloride to form soluble silver ammine complex, specifically one mole of silver reacts with two moles of ammonia. Soluble silver ammine complex was separated from the residue by filtration. Silver was chemically precipitated from the solution as pure silver metal by cementation with copper. The dissolved silver was almost quantitatively (>99.9%) recovered as silver metal.

b) Zinc Recovery

The leachate collected from the beaker after the initial leaching step was evaporated to dryness to obtain solid chloride residue. The chloride residue was then treated with a stoichiometric amount of 2M ammonium hydroxide to form soluble zinc ammine complex based on the initial zinc content as determined by ICP-MS. Zinc was then precipitated as zinc carbonate employing carbon dioxide as a precipitant. Ammonia and hydrochloric acid were regenerated for recycle. Zinc carbonate was converted to zinc oxide by thermal decomposition. More than 98% of zinc was recovered as very high purity zinc oxide based on the difference between the original (unleached) zinc content and the zinc left behind in the leached residue. ICP-MS was used to quantitatively ascertain the difference in metal content between initial and leached solids.

Example 5

20 g of crushed mixture of simple oxides, ferrites, silicates, hydroxides and carbonates containing silver zinc, copper, cobalt, nickel, gold and molybdenum metals was mixed with 400 ml of an aqueous solution of hydrochloric acid in a beaker. Aqueous supernatant samples were collected every thirty minutes and analyzed by ICP-MS for the amount of dissolved metals in the solution. The equilibrium point, a stage where there was no discernible increase in the dissolved metals in the solution, was reached in a period of 4 hours. The final leachate was separated from the residue by filtration.

a) Silver Recovery

The residue was treated with a stoichiometric amount of 2M ammonium hydroxide to dissolve the silver chloride formed during the leaching to soluble silver ammine complex with the amount of silver chloride in the solution determined by ICP-MS. Soluble silver ammine complex was separated from the residue by filtration. Silver was chemically precipitated as pure silver metal by cementation with copper. The dissolved silver was almost quantitatively recovered (>99.9%) as silver metal.

b) Zinc Recovery

The leachate collected from the beaker after the initial leaching step was evaporated to remove water. The solid chloride residues were then treated with a stoichiometric quantity of 2M ammonium hydroxide to form a soluble zinc ammonium complex. Zinc was then precipitated as zinc carbonate using carbon dioxide gas. Ammonia and hydrochloric acid were regenerated for recycling. Zinc carbonate was converted to zinc oxide by thermal decomposition. More than 99% of zinc was recovered as high purity zinc oxide based on the original zinc content in the unleached solids.

Although the present invention has been described with reference to the preferred embodiments, it is to be understood that modifications and variations may be resorted to without departing from the spirit and scope of the invention, as those skilled in the art readily understand. Such modifications and variations are considered to be within the purview and scope of the invention and the appended claims.

The invention claimed is:

1. A method for recovering at least one metal from a substrate comprising a metal sulphide, or a combination of the metal sulphide and a metal oxide, the method comprising:

a) leaching the substrate with an aqueous oxidant in an amount sufficient to oxidize the metal sulphide to elemental sulphur and oxidized metal and to convert the metal oxide, if present, to a metal salt, to obtain a pregnant solution and a solid, wherein the solid comprises the oxidized metal and metal salt, if present,
   wherein an oxidation potential of the aqueous oxidant is actively-adjusted to, and maintained at, a desired oxidation potential that is insufficient to oxidize the metal sulphide to a hexavalent state,
   wherein said leaching is conducted under ambient temperature conditions and ambient pressure conditions;

b) separating the solid and the pregnant solution obtained in step a), wherein the solid comprises the oxidized metal and metal salt, if present;

c) leaching the solid obtained in step b) comprising the oxidized metal and metal salt, if present, with ammonium hydroxide to form a soluble metal ammine complex to obtain a leachate and residual solids;

d) separating the leachate from the residual solids; and e) recovering the at least one metal from one or more of the leachate and the residual solids, wherein:

the substrate comprises silver, the soluble metal ammine complex comprises a soluble silver ammine complex, and recovering the at least one metal comprises recovering silver from the leachate.

2. The method of claim 1, wherein the aqueous oxidant is selected from the group consisting of a water-soluble peroxide, a water-soluble perchlorate, a water-soluble hypochlorite and ferric iron.

3. The method of claim 2, wherein the aqueous oxidant is ferric iron, optionally further comprising an acid.

4. The method of claim 2, wherein the water-soluble hypochlorite is sodium hypochlorite.

5. The method of claim 1, further comprising one or more of the following characteristics:

(a) the substrate further comprises copper, zinc, gold, lead, or a combination thereof;

(b) the method further comprises precipitation of the at least one metal from the leachate;

(c) the substrate is electric arc furnace dust, steel dust, foundry dust, tailings, crushed ore, mine sludge, or a combination thereof;

(d) step b) further comprises filtering to obtain the solid and the pregnant solution, and/or wherein the method further comprises, after one or more of steps c)-e), filtering to obtain a solid and a pregnant solution; and (e) the aqueous oxidant is in an amount sufficient to oxidize all of the metal sulphide and metal oxide, if present, in the substrate.

6. The method of claim 1, wherein step c) comprises leaching the solid with an aqueous solution of the ammonium hydroxide, wherein said aqueous solution is at a pH of 9 or above.

7. The method of claim 1, wherein the desired oxidation potential of the aqueous oxidant for step a) is maintained by reagent addition.

8. The method of claim 1, wherein the substrate comprises lead, and step c) further comprises contacting the oxidized metal with an alkali metal hydroxide in an amount to form soluble alkali metal plumbate.

9. The method of claim 8, wherein the alkali metal hydroxide is sodium hydroxide or potassium hydroxide.

10. The method of claim 1, further comprising recycling one or more of the aqueous oxidant and the ammonium hydroxide.

* * * * *